United States Patent
Yang

[11] Patent Number: 5,935,007
[45] Date of Patent: Aug. 10, 1999

[54] TORSIONAL VIBRATION DAMPER

[75] Inventor: Jibin Yang, Troy, Mich.

[73] Assignee: Meritor Heavy Vehicle Systems, LLC, Troy, Mich.

[21] Appl. No.: 08/865,614

[22] Filed: May 29, 1997

[51] Int. Cl.$^6$ .................................................. F16D 3/80
[52] U.S. Cl. ............................................. 464/24; 192/208
[58] Field of Search .................. 464/24, 28; 192/201, 192/208; 74/574

[56] References Cited

U.S. PATENT DOCUMENTS

| | | | |
|---|---|---|---|
| Re. 22,635 | 4/1945 | Thelander | 192/208 |
| 2,316,820 | 4/1943 | Thelander | 192/208 |
| 3,743,070 | 7/1973 | Howard et al. | 192/113 R |
| 3,986,589 | 10/1976 | Ochi et al. | 192/208 |
| 4,148,200 | 4/1979 | Schallhorn et al. | 192/208 |
| 4,351,167 | 9/1982 | Hanke et al. | 464/24 |
| 4,433,770 | 2/1984 | Loizeau et al. | 192/106.2 |
| 4,461,376 | 7/1984 | Lech, Jr. et al. | 192/106.2 |
| 4,555,008 | 11/1985 | Nagao | 192/208 |
| 4,601,676 | 7/1986 | Tojima et al. | 192/208 |
| 4,615,426 | 10/1986 | Lech, Jr. | 192/106.2 |
| 4,624,351 | 11/1986 | Lutz et al. | 192/48.5 |
| 4,638,684 | 1/1987 | Maucher | 74/574 |
| 4,674,991 | 6/1987 | Tojima et al. | 192/208 |
| 4,727,970 | 3/1988 | Reik et al. | 192/70.17 |
| 4,739,866 | 4/1988 | Reik et al. | 192/70.17 |
| 4,751,992 | 6/1988 | Maucher et al. | 192/103 A |
| 4,788,884 | 12/1988 | Reik et al. | 74/574 |
| 4,873,887 | 10/1989 | Andra et al. | 464/24 |
| 4,890,709 | 1/1990 | Reik et al. | 192/70.17 |
| 4,890,710 | 1/1990 | Reik et al. | 192/70.17 |
| 4,946,420 | 8/1990 | Jackel | 464/7 |
| 5,004,088 | 4/1991 | Bolton | 192/106.2 |
| 5,005,686 | 4/1991 | Reik et al. | 192/70.17 |
| 5,030,167 | 7/1991 | Jackel | 464/67 |
| 5,103,688 | 4/1992 | Kuhne | 74/574 |
| 5,111,924 | 5/1992 | Reik et al. | 192/70.17 |
| 5,150,777 | 9/1992 | Friedmann | 192/70.17 |
| 5,160,007 | 11/1992 | Reik et al. | 192/70.17 |
| 5,161,660 | 11/1992 | Huber | 192/106.2 |
| 5,180,044 | 1/1993 | Fukushima et al. | 192/106.1 |
| 5,188,002 | 2/1993 | Wolf et al. | 74/574 |
| 5,194,044 | 3/1993 | Jackel et al. | 464/24 |
| 5,214,975 | 6/1993 | Zalewski | 74/411 |
| 5,234,377 | 8/1993 | Stretch et al. | 464/77 |
| 5,245,889 | 9/1993 | Kohno et al. | 74/573 R |
| 5,249,659 | 10/1993 | Fukushima | 192/70.17 |
| 5,261,516 | 11/1993 | Friedmann | 192/70.17 |
| 5,293,977 | 3/1994 | Friedmann | 192/70.17 |
| 5,293,978 | 3/1994 | Reik et al. | 192/70.17 |
| 5,295,411 | 3/1994 | Speckhart | 74/574 |
| 5,301,780 | 4/1994 | Jackel | 192/70.17 |
| 5,352,157 | 10/1994 | Ochs et al. | 464/89 |
| 5,367,921 | 11/1994 | Fukushima | 74/574 |
| 5,370,580 | 12/1994 | Vollet | 464/24 |
| 5,380,248 | 1/1995 | Kraus et al. | 464/66 |
| 5,385,018 | 1/1995 | Kohno et al. | 60/338 |
| 5,386,896 | 2/1995 | Matsuoka | 192/3.29 |
| 5,388,481 | 2/1995 | Andra | 74/574 |
| 5,411,439 | 5/1995 | Sacher | 464/67 |
| 5,415,062 | 5/1995 | Kohno et al. | 74/574 |
| 5,415,261 | 5/1995 | Friedmann | 192/70.17 |
| 5,445,049 | 8/1995 | Ullrich et al. | 74/574 |

OTHER PUBLICATIONS

Consideration of a New Type Two–Mass Flywheel by Yamamoto et al., 1991.

*Primary Examiner*—Eileen Dunn Lillis

[57] ABSTRACT

A torque transmission system includes a torsional vibration damper with a centrifugal valve separating first chamber and second chambers filled with fluid. At low engine speeds, the centrifugal valve is spring biased in a substantially closed position so that there is minimal fluid flow between the chambers, thus resulting in high stiffness and high damping for reducing resonance vibrations. As the engine speed increases, centrifugal force eventually overcomes the spring force due to increased engine speeds. Thus, at high engine speeds the centrifugal valve is open, allowing a greater amount of fluid to flow from the first chamber to the second resulting in decreased stiffness and transmissibility for more effectively reducing vibrations.

21 Claims, 2 Drawing Sheets

TORSIONAL VIBRATION DAMPER

BACKGROUND OF THE INVENTION

This invention relates to a unique torsional vibration damper for a system which transfers torque from an engine to a transmission.

Torque transmission systems are widely used in vehicle powertrains. In a typical powertrain, an engine produces torque which is transmitted from an engine crankshaft to a transmission input shaft via the torque transmission system. The transmission transmits torque to a drive shaft coupled to an axle differential, which transmits torque to the vehicle wheels. Because the engine delivers the driving torque for the vehicle by means of various rotatable components, the engine is a source for vibration excitation on the vehicle.

Piston engines have reciprocating pistons in a cylinder, which by definition involves a cyclic process. Thus, the torque delivered by the engine is not constant in magnitude. Instead, the torque consists of a series of pulses which correspond to individual cylinder strokes. The amplitude of the pulses depends on how powerful the engine is and the frequency of the pulses fluctuates with engine speed. As engines become more and more powerful, the fluctuation of engine output speed has increased significantly which in turn has increased the vibration excitation on the vehicle. This is undesirable as it causes problems such as noise, gear rattling, and decreased component life.

Known torque transmission systems comprised of dual flywheels have been used to dampen engine vibrations. These systems are typically located between the engine and the transmission and receive input torque from the engine crankshaft and transmit the torque to the transmission while damping out torsional vibrations. Typically the torque transmission system includes a first flywheel connected to the crankshaft and a second flywheel connected to the transmission input shaft. Each flywheel can move independently relative to the other. Torsional vibration dampers are operably located between the first and second flywheels and resist relative angular movements between the first and second flywheels. Various types of torsional vibration dampers are known in the art, including hydraulic dampers which utilize viscous fluid, elastic dampers such as springs, and frictional dampers. Often a hydraulic damper is used in addition to an elastic damper to adequately reduce torsional vibrations at both high and low engine speeds.

The torsional vibration damper must have high stiffness and high damping at low engine speeds for reducing resonance vibrations, and low stiffness and low damping at high engine speeds so that vibrations can be reduced. The overall goal is to reduce the transmissibility at practical engine speeds. Transmissibility is defined as a measure of the ability of a system to either amplify or suppress an input vibration, equal to the ratio of the response amplitude of the system in steady-state forced vibration to the excitation amplitude; the ratio may be in forces, displacements, velocities, or accelerations. To decrease the transmissibility at practical engine speeds, the resonance frequency must be designed to be within the range below practical engine speeds. This placement of the resonance frequency in relation to engine speed is controlled by stiffness and inertia. However, if the resonance frequency is below practical engine speeds then the frequency of the engine rotating speed will necessarily coincide with the resonance frequency at some point during the starting or stopping of the engine. To avoid a resonance problem at these low engine speeds, the resonance peak or maximum amplitude must be reduced. Damping by means of a torsional damper controls the amplitude of the resonance peak.

Certain deficiencies exist with known torsional vibration dampers. Usually more than one damper is required to accomplish the dual purpose of controlling resonance frequency and reducing the amplitude thereof at variable engine speeds. Typically, elastic dampers such as coil springs are used to provide stiffness at low engine speeds while hydraulic dampers take effect at higher engine speeds. Thus, more parts are required. Packaging difficulty is increased as more dampers are used. Therefore, there is a need for single torsional vibration damper of simple construction which can accomplish these dual purposes.

Also, there are additional deficiencies with prior art hydraulic dampers. Most hydraulic dampers are comprised of various machined components which move in relation to each other. When two machined surfaces contact each other for the purpose of preventing fluid flow, leakage can occur due to manufacturing inaccuracies. Additionally, these hydraulic dampers have complex sealing systems to prevent fluid loss to other areas of the torque transmission system. Thus, there is a need for a simple, self contained hydraulic damper which eliminates leakage resulting from manufacturing inaccuracies and which simplifies the sealing system used to prevent fluid loss to other areas of the torque transmission system.

SUMMARY OF THE INVENTION

The subject invention relates to an apparatus for damping torsional vibrations occurring in vehicular power train systems. The apparatus preferably includes a first flywheel defining an axis of rotation for receiving rotational input from an engine crankshaft and a second flywheel, substantially coaxial with the first flywheel, and independently rotatable with respect to the first flywheel, for transmitting rotation to an output. A torsional vibration damper reacts between the flywheels and opposes angular movements of the first and second flywheels relative to each other. The torsional vibration damper includes first and second ends supported by the first and second flywheels for rotation with the flywheels. The torsional vibration damper further includes first and second chambers for receiving a total volume of viscous fluid and flow control which separates the first and second chambers for controlling viscous fluid flow between the chambers in response to centrifugal forces resulting from varying engine speed.

The inventive torsional vibration damper is simply controlled by centrifugal force. The flow control includes a centrifugal valve which separates the first and second chambers which are filled with fluid. The valve includes a valve body and a passageway which allows fluid to flow between the first and second chambers. When the centrifugal force is small, the valve body is spring biased in a substantially closed position such that the passageway between the chambers is of small cross sectional area. Thus, there is minimal fluid flow between the chambers, resulting in high stiffness and high damping for reducing resonance vibrations. As the centrifugal force increases due to increasing engine speeds, the valve body eventually overcomes the spring force as a result of increased centrifugal forces. Thus, at high engine speeds the cross sectional area of the passageway between the chambers increases, allowing a greater amount fluid to flow from the first chamber to the second resulting in decreased stiffness and transmissibility for more effectively reducing vibrations.

Ideally, the initial resonance frequency will be high during low engine speeds but will shift to a lower frequency once engine speed increases. This shift is controlled by variable stiffness resulting from the use of the inventive vibration damper. Thus, the resonance frequency is not a fixed system parameter. Stiffness controls the frequency location of the resonance frequency in relation to engine speed. The stiffness of the torsional vibration damper of the subject invention varies with respect to the varying centrifugal force of the system. At small centrifugal forces, low engine speeds, the stiffness is high and at larger centrifugal forces, higher engine speeds, the stiffness is low. The varying stiffness of the vibration damper adjusts the location of the system resonance frequency. At low stiffness, high engine speed, the resonance frequency is low, i.e., below practical engine speeds. At high stiffness, low engine speed, the resonance frequency is higher. However, as engine speed increases and the resonance frequency shifts from a higher frequency to a lower frequency there will be a point at which they will overlap which is undesirable but necessary. One of the advantages of the vibration damper of the subject invention is that this overlap time is of very small duration.

Additionally, the torsional vibration damper of the subject invention achieves the dual purpose of controlling natural frequency and reducing the amplitude thereof at variable engine speeds. The torsional damper accomplishes this by combining hydraulic and elastic damping in a single apparatus. The torsional vibration damper is of simple construction with fewer parts and improved packaging capabilities. Also, hydraulic damping is completely self-contained so that leakage resulting from manufacturing inaccuracies in machined surfaces is eliminated, and the complicated sealing systems as used in prior art systems are no longer necessary.

Another advantage of the subject invention is that it is easily adapted to include active control whereas prior art vibration dampers are not. In an active control system, various parameters such as engine speed, vibration frequency, and vibration amplitude are continuously monitored and data is fed back to a control system such that stiffness and damping are continuously adjusted to their maximum beneficial operating level.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
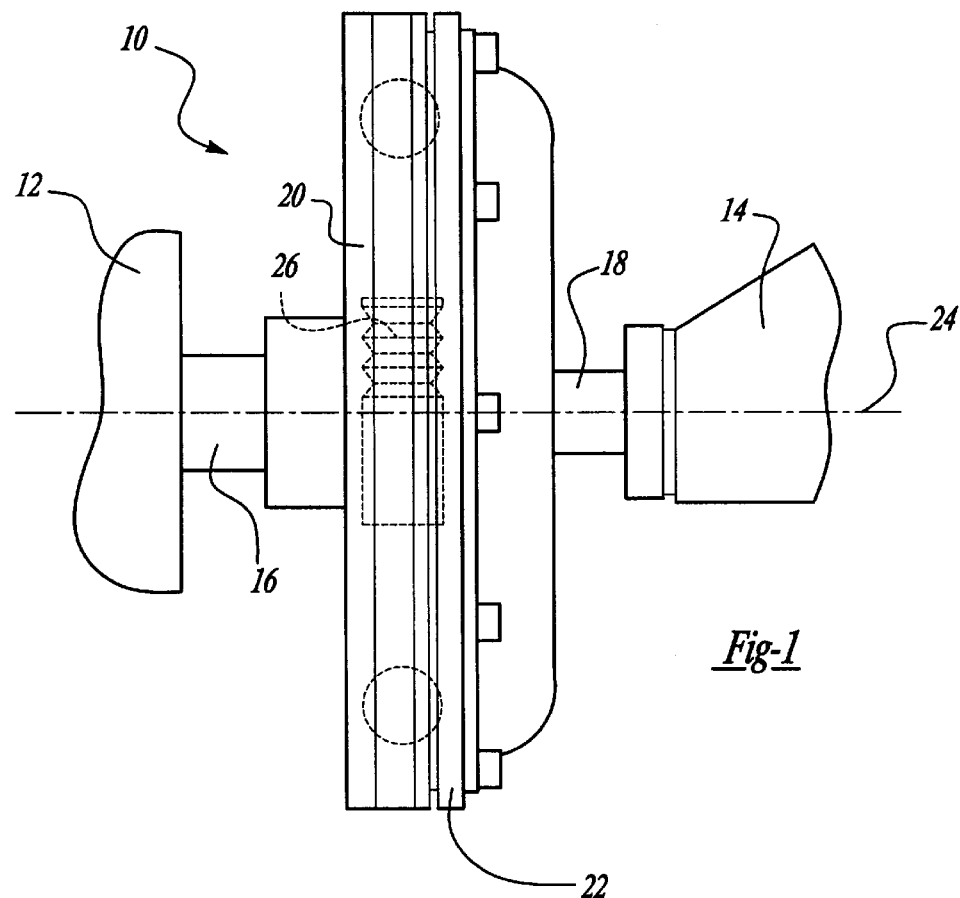
FIG. 1 is a side view of the torsional vibration damper of the subject invention as used in a powertrain system.

A torque transmission system 10 is shown in FIG. 1, located between engine 12 and transmission 14 in a vehicle powertrain system. Torque transmission system 10 receives input torque from engine 12 via engine crankshaft 16 and transmits output torque to transmission 14 through a transmission input shaft 18. Another function of the torque transmission system 10 is to reduce vibrations resulting from the powerful, high torque engines 12 used to drive vehicles. The torque transmission system 10 accomplishes this by using large inertial masses in conjunction with vibration dampers.

The torque transmission system 10 includes a first flywheel 20, defining an axis of rotation 24, and a second flywheel 22, substantially coaxial with the first flywheel 20. The first 20 and second 22 flywheels are large inertial masses which can rotate about the axis of rotation 24 independently from each other. The first flywheel 20 is connected to the engine crankshaft 16 and the second flywheel 22 is connected to the transmission input shaft 18. The crankshaft 16 and transmission input shaft 18 are also substantially coaxial with the first 20 and second 22 flywheels. Thus, rotational input from the engine crankshaft 16 is transmitted to the first flywheel 20 which rotates and transmits torque to the second flywheel 22 by way of bearing means well known in the art, causing second flywheel 22 to rotate and to transmit torque to the transmission input shaft 18. In addition to the large inertial masses, the torque transmission system 10 includes a plurality of torsional vibration dampers 26 which react between the flywheels 20, 22 and opposes angular movements of the first 20 and second 22 flywheels relative to each other. Accordingly, the torque which drives the vehicle is transmitted from the engine 12 to the transmission 14 while torsional vibrations are significantly reduced.

Figure 2:
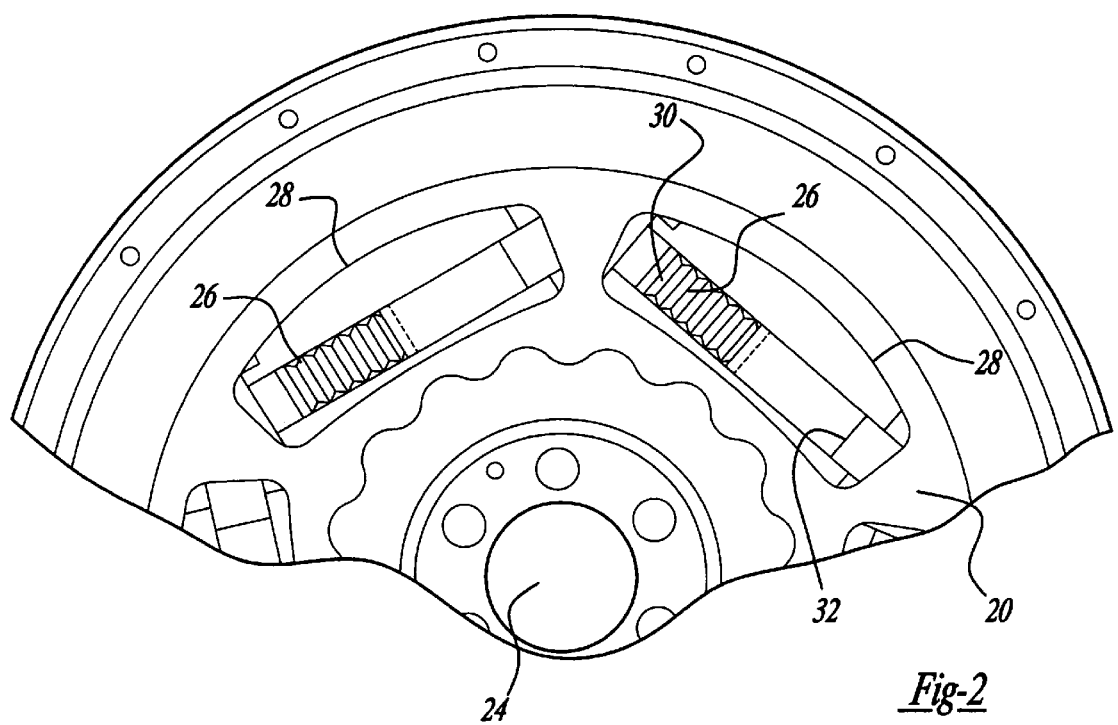
FIG. 2 is a front view showing a plurality of torsional vibration dampers as used in at power train system.

As shown in FIG. 2, a plurality of torsional vibration dampers 26 are used in a single torque transmission system 10. The first 20 and second 22 flywheels include windows 28 which are spaced circumferentially about the axis of the rotation 24. The torsional vibration dampers 26 are received in these windows 28 and the first 20 and second 22 flywheels support ends 30 and 32, respectively, of each vibration damper 26. As the flywheels 20, 22 rotate, the torsional vibration dampers 26 also rotate but are supported by the flywheels 20, 22 such that the vibration dampers 26 oppose any angular movement of the first 20 and second 22 flywheels with respect to each other.

Figure 3A:
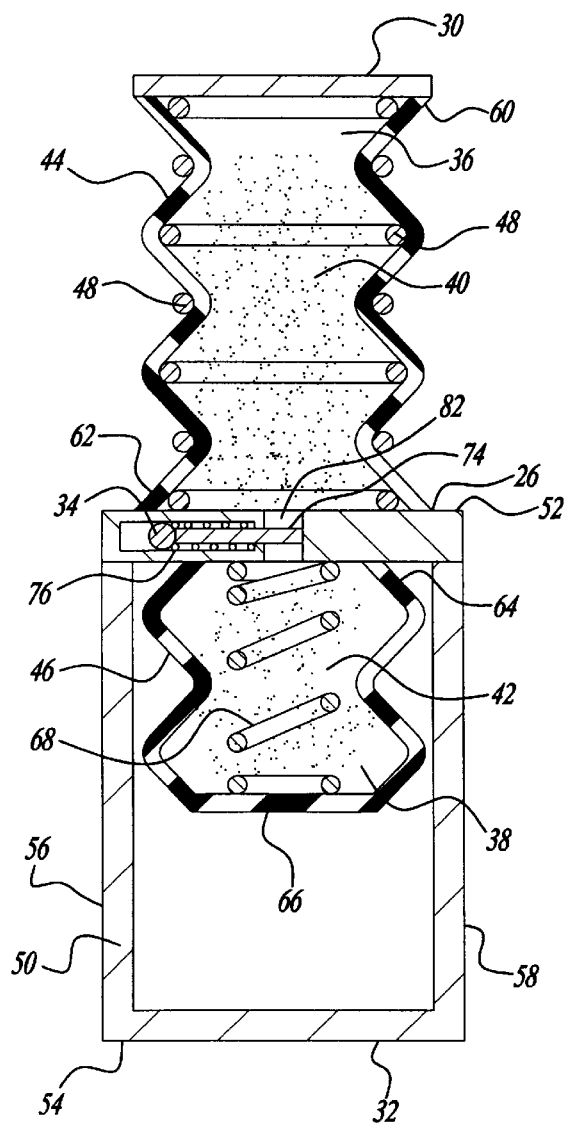
FIG. 3A is a magnified view of the torsional vibration damper showing the centrifugal valve in the closed position.

As shown in FIG. 3A, the torsional vibration damper 26 includes a first end 30 supported by the first flywheel 20 and a second end 32 supported by the second flywheel 22. It is understood that either end 30, 32 of the torsional vibration damper 26 could be supported by either flywheel 20, 22 and that both flywheels 20, 22 could independently support each end 30, 32 of the vibration damper 26. The important feature of the mounting of the vibration damper 26 to the flywheels 20, 22 is the ability of the vibration damper 26 to oppose any movement or rotation of one flywheel with respect to the other. The torsional vibration damper 26 further includes a flow control here a centrifugal valve 34, separating first 36 and second 38 chambers. The left hand side of the illustrated damper is positioned radially outwardly when mounted to the flywheel such that centrifugal force will open the valve. Both the first 36 and second 38 chambers are filled with a viscous fluid and the centrifugal valve 34 controls the fluid flow between the chambers 36, 38 in response to centrifugal forces resulting from varying engine speed.

The torsional vibration damper 26 is of variable stiffness depending on the magnitude of the centrifugal force as it relates to engine speed. The stiffness is high at low engine speeds, i.e., small centrifugal force, to reduce resonance vibrations and the stiffness is lower at higher engine speeds, i.e., larger centrifugal force, to reduce high frequency vibrations. Also, the stiffness of the damper 26 controls the placement of the system resonance frequency. When the stiffness is low the resonance frequency is also low, i.e., it occurs below practical engine speeds. When the stiffness is high, the resonance frequency is high. Thus, when the engine is operating at low speeds with the vibration damper 26 at high stiffness, the resonance frequency is high and out of operating range. When the engine is operating at high speeds with the vibration damper 26 at low stiffness, the resonance frequency shifts from the higher frequency to a lower frequency so that at high speeds the resonance frequency is also out of operating range. However, as engine speed increases from a low speed to a high speed, the resonance frequency shifts from a high frequency to a lower frequency and the resonance frequency will necessarily fall into the engine operating range. An advantage of the inventive vibration damper is that the overlap time of the resonance frequency within the engine operating speed is of very short duration.

The stiffness of the torsional vibration damper 26 is controlled by the centrifugal valve 34. The centrifugal valve 34 is substantially closed at low engine speeds and allows minimal fluid to flow between the first 36 and second 38 chambers. Since only a small amount of fluid can flow between the chambers 36, 38 the damper 26 is stiff.

Figure 3B:
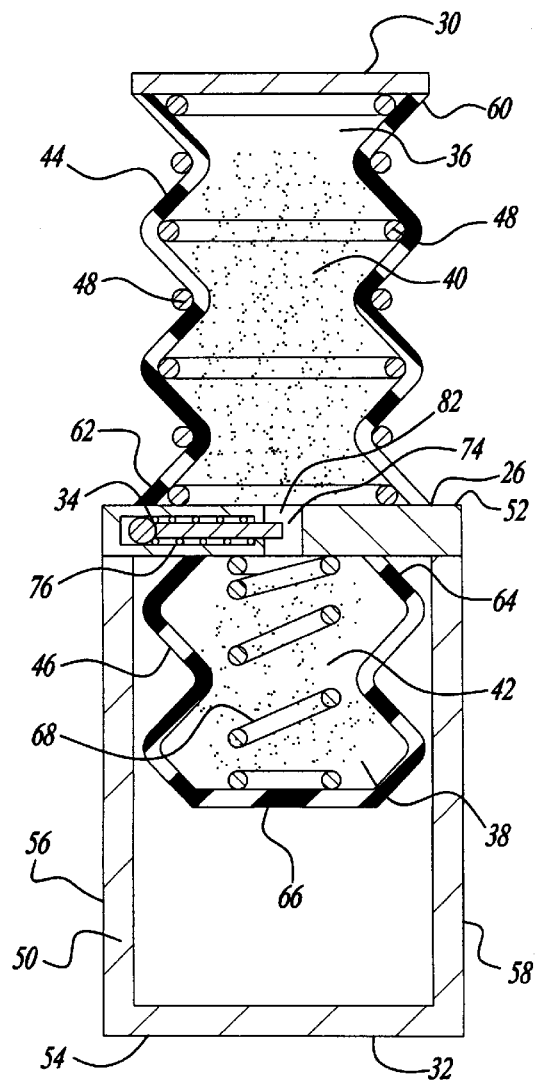
FIG. 3B is a magnified view of the torsional vibration damper showing the centrifugal valve in the open position.

As shown in FIG. 3B, the centrifugal valve 34 becomes substantially open at higher engine speeds as the centrifugal force increases and opens the valve 34 even more to allow a greater amount of fluid to flow between the first 36 and second 38 chambers. Thus, the stiffness of the torsional vibration damper 26 decreases as greater amounts of fluid flow between the chambers 36, 38.

References to higher or lower engine speeds and smaller and larger centrifugal forces are relative to a predetermined level as set by the design parameters of the torque transmission system 10. The centrifugal valve 34 must be designed to be substantially closed at low engine speeds meaning engines speeds where the vehicle is idling or just starting to accelerate. As the vehicle continues to accelerate, the engine speed increases which in turn increases the centrifugal force. The centrifugal valve 34 can be designed to increase fluid flow between chambers 36, 38 due to the centrifugal force at a specific engine speed achieved sometime during the acceleration of the vehicle. Once the vehicle has reached full operating speed, or in other words the engine is at its practical engine speed, the centrifugal valve 34 should be substantially open.

The torsional vibration damper 26 has a total volume of viscous fluid which remains constant as the centrifugal force varies. This total volume is the sum of a first volume of viscous fluid 40 contained in the first chamber 36 and a second volume of viscous fluid 42 contained in the second chamber 38. The first 40 and second 42 volumes of fluid vary with respect to their initial volumes depending on whether the centrifugal valve 34 is in the open or substantially closed position. If the valve 34 is open, fluid can flow between the first chamber 36 and the second chamber 38 depending on which direction the first 20 and second 22 flywheels are rotating. Even though the first 40 and second 42 volumes of fluid in the first 36 and second 38 chambers can vary from their initial volumes and can vary with respect to each other, the overall total volume, i.e., the first volume of fluid 40 plus the second volume of fluid 42, remains constant during all operations of the torsional vibration damper 26.

The first chamber 36 is comprised of a first flexible bellows 44 and the second chamber 38 is comprised of a second flexible bellows 46. Each chamber 36, 38 defines variable volumes which vary inversely to one another because the first 44 and second 46 bellows have the ability to expand or contract depending on the amount fluid contained in each bellows 44, 46. For example, as more fluid flows into the first bellows 44, it responds by expanding in a longitudinal direction while the second bellows 46 responds by contracting in the longitudinal direction. If fluid flows from the first bellows 44 into the second bellows 46, the first bellows 44 contracts and the second bellows 46 expands. Thus, the volume of viscous fluid in each bellows 44, 46 continuously varies and the volume of the chambers 36, 38 themselves, i.e. the bellows 44, 46, continuously vary during the operation of the engine. This allows the torsional vibration damper 26 to act as a hydraulic damper with advantages over prior art hydraulic dampers. The torsional vibration damper 26 of the subject invention is a completely self-contained system.

The viscous fluid is contained within the flexible bellows 44, 46 so the possibility of leakage of fluid to other areas of the torque transmission system 10 is eliminated. Also, the need for complex sealing systems to prevent fluid loss to other areas is eliminated.

Additionally, bellows 44, 46 can longitudinally expand or contract due to movements of the first 20 and second 22 flywheels with respect to each other. In this situation the bellows 44, 46 act as an elastic damper for opposing movements of the flywheels 20, 22 with respect to each other and thereby increase the overall damping effectiveness of the torque transmission system 10. Thus the torsional vibration damper 26 includes two different types of vibration dampers in a single unit. The torsional vibration damper includes a hydraulic damper utilizing a centrifugal valve 34 for controlling the fluid flow between flexible bellows 44, 46 and thereby controlling stiffness for damping out low and high frequency vibrations. And the torsional vibration damper 26 includes an elastic damper utilizing the two flexible bellows 44, 46 supported by the first 20 and second 22 flywheels for additionally damping out vibrations. In the preferred embodiment the flexible bellows 44, 46 are made from a rubber based material. However, other types of flexible material could be used.

The first 44 and second 46 bellows also include reinforcing elements 48 which prevent the bellows 44, 46 from substantially exceeding a maximum allowable diameter. In the preferred embodiment these reinforcing elements 48 are comprised of a plurality of rings 48 spaced apart from one another and which substantially surround the bellows 44, 46. These rings 48 can surround the bellows 44, 46 on the outside, can be located inside of the bellows 44, 46, or the rings 48 can be formed inside of the bellows material itself. These reinforcing elements 48 prevent the bellows 44, 46 from "ballooning" out as they are filled with viscous fluid. This means that during the operation of the torsional vibration damper 26, the overall diameter of the bellows 44, 46 will not drastically change from its initial position. The key movement of the bellows 44, 46 is their ability to longitudinally expand and contract.

The torsional vibration damper 26 further includes a frame 50 of rectangular shape with a first end 52 and a second end 54 and a first wall 56 and a second wall 58. The first end 52 houses the centrifugal valve 34 and the second end 54 is supported by the second flywheel 22 at 32. The first bellows 44 has a first end 60 which is supported by the first flywheel 20 at 30 and a second end 62 which is attached to the first end 52 of the frame 50 on one side of the centrifugal valve 34. The second bellows 46 has a first 64 and second 66 end and is located inside of the frame 50 between the first 56 and second 58 walls. The second end 66 of the second bellows 46 is unsupported while the first end 64 is attached to the first end 52 of frame 50 on the opposite side of the centrifugal valve 34 from where the first bellows 44 is attached. The frame 50 can be of various shapes and should not be limited to a rectangular shape only. Also, the second end 54 of the frame could be supported by either flywheel 20, 22 or could be independently supported by both flywheels 20, 22. Also, the bellows 44, 46 can be reversed in position where the first bellows 44 located inside of the frame 50 instead of the second bellows 46.

As shown, the second bellows 46 includes a spring element 68 which establishes a minimum volume for the second bellows 46. This spring element 68 biases the second bellows 46 to an initial position and provides support for the second end 66 of the second bellows 46. The volume of the second bellows 46 can change as fluid flows between the chambers 36, 38 but the minimum allowable volume is achieved when the spring element 68 is in its fully compressed position. In the preferred embodiment the spring element 68 is located inside the second bellows 46 with a first end 70 of the spring element 68 attached to the frame 50 adjacent to the centrifugal valve 34 and a second end 72 of the spring element 68 attached to the second end 66 of the second bellows 46. A spring element 68 could be used in the first bellows 44 instead of the second bellows 46. Also, both bellows 44, 46 could include internal spring elements 68.

The centrifugal valve 34 is comprised of a valve body 74 and a spring 76 with one spring end supporting the valve body 74 while a second spring end is attached to the frame 50. The frame 50 includes a passageway 82 from the first chamber 36 to the second chamber 38. As shown in FIG. 3A the spring 76 has a predetermined spring force which biases the valve body 74 such that it substantially blocks the passageway 82 in the frame 50 between the first 36 and second 38 chambers at low engine speeds, i.e., small centrifugal force. Thus, the torsional vibration damper 26 is stiff because the passageway has a small cross sectional area and only a minimal amount of fluid can flow between the chambers 36, 38.

As shown in FIG. 3B, at higher engine speeds the centrifugal force overcomes the spring force, compressing the spring 76, causing the valve body 74 to move away from the passageway 82 in the frame 50. This means that the cross sectional area of the passageway increases and more fluid can flow between the first 36 and second 38 chambers, thus, decreasing the stiffness. That is, the valve 41 is positioned radially outwardly of passage 82, such that it does move outwardly due to centrifugal force. As fluid flows between the chambers 36, 38 the stiffness of the torsional vibration damper 26 decreases and high frequency vibrations are filtered out.

The torsional vibration damper 26 of the subject invention is of variable stiffness and controlled by the centrifugal forces created by the engine 12. Thus, the system resonance frequency can be adjusted such that the engine spends a minimal amount of time operating at this undesirable frequency. The torsional vibration damper 26 is of simple construction and effectively dampens vibrations in two different ways. As a single unit, the torsional vibration damper 26 includes a hydraulic damper which utilizes a centrifugal valve 34 to control fluid flow between flexible chambers 36, 38 and includes an elastic damper which utilizes flexible bellows 44, 46 to oppose movements of the first 20 and second 22 flywheels relative to each other. Since two different types of dampers are combined efficiently into a single unit, the assembly and packaging of the torsional vibration damper 26 into the torque transmission system 10 is improved over prior art systems. Additionally, the torsional vibration damper 26 of the subject invention is completely self contained. The fluid is contained within the flexible bellows 44, 46 and therefore cannot leak out to other areas of the torque transmission system 10. This eliminates the need for complex sealing configurations as required by prior art systems.

A preferred embodiment of this invention has been disclosed, however, a worker of ordinary skill in the art would recognize that certain modifications come within the scope of this invention. For that reason, the following claims should be studied to determine the true scope and content of this invention.

I claim:

1. An apparatus for damping torsional vibrations comprising:

a first flywheel defining an axis of rotation for receiving a rotational input;

a second flywheel substantially coaxial with said first flywheel and independently rotatable with respect to said first flywheel for transmitting rotational output to an output;

a torsional vibration damper reacting between said flywheels for opposing angular movements of said first and second flywheels relative to each other;

said torsional vibration damper including first and second ends supported by said first and second flywheels respectively for rotation with said flywheels;

said torsional vibration damper further including first and second chambers for receiving a total volume viscous fluid and a flow control separating said first and second chambers for controlling the amount fluid flow between said chambers in response to centrifugal forces resulting from varying rotational speeds, said flow control including a centrifugal valve for varying the proportions of said total volume between said first and second chambers in response to centrifugal force resulting from rotation of said flywheels with said total volume remaining constant.

2. The apparatus as set forth in claim 1 wherein said first and second chambers each define variable volumes which vary inversely to one another.

3. The apparatus as set forth in claim 2 wherein said first and second chambers are defined by first and second flexible bellows.

4. The apparatus as recited in claim 3 wherein said torsional vibration damper includes a frame with a first end supported by one of said flywheels and a second end supporting said centrifugal valve.

5. The apparatus as recited in claim 4 wherein said first bellows includes a first end supported by the other of said flywheels and a second end supported by said frame adjacent to said centrifugal valve and said second bellows includes a first end supported by said frame adjacent said centrifugal valve and opposite from said first bellows and a second end that is unsupported.

6. The apparatus as recited in claim 3 wherein at least one of said bellows includes a spring element for establishing a minimum volume of said chamber.

7. The apparatus as recited in claim 6 wherein said spring element is internally located in said bellows with a first end attached at one end of said bellows and a second end attached to said opposite end of said bellows.

8. The apparatus as recited in claim 1 wherein said torsional vibration damper includes a plurality of elastic dampers reacting between said flywheels for opposing angular movements of said first and second flywheels relative to each other, said elastic dampers including first and second ends supported by said flywheels.

9. The apparatus as recited in claim 8 wherein said elastic dampers includes first and second flexible bellows, said first bellows operably associated with said first flywheel and said second bellows operably associated with said second flywheel.

10. An apparatus for damping torsional vibrations comprising:

a first flywheel defining an axis of rotation for receiving a rotational input;

a second flywheel substantially coaxial with said first flywheel and independently rotatable with respect to said first flywheel for transmitting rotational output to an output;

a torsional vibration damper reacting between said flywheels for opposing angular movements of said first and second flywheels relative to each other;

said torsional vibration damper including first and second ends supported by said first and second flywheels respectively for rotation with said flywheels;

said torsional vibration damper further including first and second chambers for receiving a total volume viscous fluid, a flow control separating said first and second chambers for controlling the amount fluid flow between said chambers in response to centrifugal forces resulting from varying rotational speeds, and a frame supported by one of said flywheels and including a passageway between said first and second chambers and wherein said flow control includes a valve body and a spring mounted in said frame with a first spring end supporting said valve body and a second spring end attached to said frame.

11. The apparatus as recited in claim 10 wherein said valve body substantially blocks said passageway in said frame at a low centrifugal force to allow only a minimal amount of fluid to flow between said first and second chambers.

12. The apparatus as recited in claim 11 wherein said valve body moves away from said passageway in said frame to allow increased fluid flow between said first and second chambers at a higher centrifugal force.

13. A torsional vibration damper for reacting between first and second flywheels for opposing angular movements of the first and second flywheels relative to each other comprising:

a first variable chamber for receiving a first volume of viscous fluid;

a second variable chamber for receiving a second volume of viscous fluid said first and second chambers supported by first and second flywheels and said first and second volumes comprising a total volume; and a flow control separating said first and second chambers for controlling fluid flow between said chambers in response to centrifugal forces resulting from varying engine speeds wherein said flow control includes a centrifugal valve for varying the proportions of said first and second volumes of viscous fluid between said first and second chambers in response to centrifugal force resulting from rotation of said flywheels while said total volume remains constant.

14. A torsional vibration damper as recited in claim 13 wherein said first and second variable chambers comprise first and second bellows.

15. A torsional vibration damper as recited in claim 14 wherein said first and second bellows include a reinforcing element for preventing said first and second bellows from substantially exceeding a maximum allowable diameter.

16. A torsional vibration damper as recited in claim 15 wherein said centrifugal valve is comprised of a valve body and a spring with a first spring end supporting said valve body and a second spring end attached to a frame, said frame supported by said flywheels and including a passageway between said first and second chambers.

17. A torsional vibration damper as recited in claim 16 wherein said valve body substantially blocks said passageway to allow only minimal fluid flow between said first and second chambers at low centrifugal force and wherein said valve body moves away from said passageway in said frame to allow increased fluid to flow between said first and second chambers at a higher centrifugal force.

18. A torsional vibration damper for reacting between first and second flywheels for opposing angular movements of the first and second flywheels relative to each other comprising:

a first variable chamber for receiving a first volume of viscous fluid;

a second variable chamber for receiving a second volume of viscous fluid said first and second chambers supported by first and second flywheels and said first and second volumes comprising a total volume; and a flow control separating said first and second chambers for controlling fluid flow between said chambers in response to centrifugal forces resulting from varying engine speeds wherein said flow control includes a centrifugal valve for varying the stiffness of said first and second chambers in response to centrifugal force.

19. A torsional vibration damper as recited in claim 18 wherein the stiffness of said first and second chambers is high at low centrifugal force and the stiffness is low at high centrifugal force.

20. A torsional vibration damper as recited in claim 19 wherein due to varying stiffness of said chambers, the resonance frequency changes from a higher frequency at low centrifugal force to a lower frequency at a higher centrifugal force.

21. A method of dampening vibration comprising the steps of:

a) providing a first and a second flywheel, said first and second flywheel being mounted for relative rotation on a common axis, providing a plurality of vibration dampers, each of said dampers including a pair of variable volume fluid chambers with a valve positioned between said fluid chambers, said damper being mounted between said first and second flywheels to oppose movement of said first and second flywheels, and positioning said valve such that said valve tends to be closed at low rotational speeds of said flywheels and open at higher speeds of said flywheels due to centrifugal force;

b) driving one of said flywheels, and causing the other of said flywheels to rotate with said one flywheel, and increasing the speed of rotation; and c) said valve tending to be closed at lower speeds resulting in a high stiffness force of vibration damper, and tending to move to an open position at increasing speeds resulting in a lower stiffness force at vibration damper.

* * * * *